(12) United States Patent
Zhang et al.

(10) Patent No.: US 10,873,382 B2
(45) Date of Patent: Dec. 22, 2020

(54) BEAM SWITCHING METHOD AND RELATED DEVICE

(71) Applicant: HUAWEI TECHNOLOGIES CO., LTD., Shenzhen (CN)

(72) Inventors: Xi Zhang, Chengdu (CN); Peng Guan, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/522,656

(22) Filed: Jul. 26, 2019

(65) Prior Publication Data

US 2019/0349065 A1     Nov. 14, 2019

Related U.S. Application Data

(63) Continuation of application No. PCT/CN2017/118134, filed on Dec. 23, 2017.

(30) Foreign Application Priority Data

Jan. 26, 2017 (CN) .......................... 2017 1 0057296

(51) Int. Cl.
    *H04B 7/06*      (2006.01)
    *H04B 7/08*      (2006.01)
    (Continued)

(52) U.S. Cl.
CPC ........... *H04B 7/0695* (2013.01); *H04B 7/088* (2013.01); *H04W 36/06* (2013.01); *H04W 72/046* (2013.01); *H04W 72/1273* (2013.01)

(58) Field of Classification Search
CPC ...... H04B 7/0695; H04B 7/088; H04B 36/06; H04W 72/046; H04W 72/1273
See application file for complete search history.

(56) References Cited

U.S. PATENT DOCUMENTS

2010/0272077 A1   10/2010   Van Rensburg et al.
2012/0307726 A1   12/2012   Pi et al.
(Continued)

FOREIGN PATENT DOCUMENTS

CN    101753188 A    6/2010
CN    103607231 A    2/2014
(Continued)

OTHER PUBLICATIONS

Catt,"Discussion on NR 4-step RA Procedure",3GPP TSG RAN WG1 AH_NR Meeting R1-1700185,Spokane, USA, Jan. 16-20, 2017,total 4 pages.
(Continued)

*Primary Examiner* — Ted M Wang
(74) *Attorney, Agent, or Firm* — Kilpatrick Townsend & Stockton LLP

(57) ABSTRACT

Embodiments provide a beam switching method and a related device. Under the method a first subframe sent by a base station by using a first beam can be received by a terminal device. The first subframe includes first-order downlink control information and second-order downlink control information. The terminal device can search for the second-order downlink control information based on the first-order downlink control information. The first-order downlink control information includes location indication information of the second-order downlink control information in the first subframe. the terminal device can switch from the first beam to a second beam based on the found second-order downlink control information to receive a second subframe. The downlink control information includes a switching indication field of the second beam. In this way, flexibility of beam switching is improved, load balancing of a control channel is implemented, and a latency of beam switching is reduced.

6 Claims, 9 Drawing Sheets

(51) Int. Cl.
*H04W 36/06* (2009.01)
*H04W 72/04* (2009.01)
*H04W 72/12* (2009.01)

(56) References Cited

U.S. PATENT DOCUMENTS

| | | | |
|---|---|---|---|
| 2013/0279356 | A1 | 10/2013 | Park et al. |
| 2016/0337916 | A1* | 11/2016 | Deenoo ............. H04W 36/0088 |
| 2018/0309496 | A1* | 10/2018 | Lee ....................... H04L 5/0053 |

FOREIGN PATENT DOCUMENTS

| | | |
|---|---|---|
| CN | 103607233 A | 2/2014 |
| CN | 104683079 A | 6/2015 |
| WO | 2013154334 A1 | 10/2013 |

OTHER PUBLICATIONS

3GPP TS 36.211 V12.4.0 (Dec. 2014);3rd Generation Partnership Project;Technical Specification Group Radio Access Network;Evolved Universal Terrestrial Radio Access (E-UTRA);Physical channels and modulation(Release 12);total 124 pages.

3GPP TS 36.212 V13.0.0 (Dec. 2015);3rd Generation Partnership Project;Technical Specification Group Radio Access Network;Evolved Universal Terrestrial Radio Access (E-UTRA);Multiplexing and channel coding(Release 13);total 121 pages.

3GPP TS 36.213 V13.0.0 (Dec. 2015);3rd Generation Partnership Project;Technical Specification Group Radio Access Network;Evolved Universal Terrestrial Radio Access (E-UTRA);Physical layer procedures(Release 13);total 326 pages.

Cisco et al.,TS V5G.211 V1.7 (Dec. 2016),Verizon 5G TF;Air Interface Working Group;Verizon 5th Generation Radio Access;Physical channels and modulation(Release 1),total 83 pages.

Cisco et al.,TS V5G.212 V1.5 (Sep. 2016),Verizon 5G TF;Air Interface Working Group;Verizon 5th Generation Radio Access;Multiplexing and channel coding(Release 1),total 62 pages.

Cisco et al.,TS V5G.213 v1.4 (Dec. 2016),Verizon 5G TF;Air Interface Working Group;Verizon 5th Generation Radio Access;Physical layer procedures(Release 1),total 50 pages.

Intel Corporation:"Discussion on network initiated beam recovery in NR", 3GPP DRAFT; R1-1700345, vol. RAN WG1, No. Spokane, USA; 20170116-20170120, Jan. 16, 2017, XP051207882, 4 pages.

Guangdong Oppo Mobile Telecom:"DL control channel design for multi-beam transmission above 6GHz", 3GPP DRAFT; R1-1700563, vol. RAN WG1, No. Spokane, USA; 20170116-20170120, Jan. 16, 2017, XP051208093, 6 pages.

Huawei Hisilicon:"Discussion on beam management aspects for DL MIMO", 3GPP DRAFT; R1-1611670, vol. RAN WG1, No. Reno, USA; 20161114-20161118 Nov. 13, 2016, XP051175642, 8 pages.

\* cited by examiner

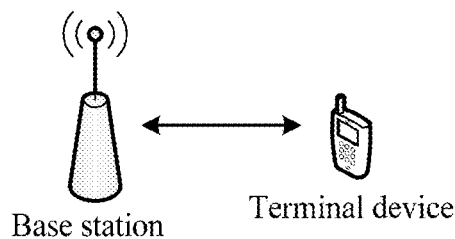

Base station    Terminal device

FIG. 1

| A terminal device receives a first subframe sent by a base station by using a first beam, where the first subframe includes first-order downlink control information and second-order downlink control information | S201 |

| The terminal device searches for the second-order downlink control information based on the first-order downlink control information, where the first-order downlink control information includes location indication information of the second-order downlink control information in the first subframe | S202 |

| The terminal device switches from the first beam to a second beam based on the found second-order downlink control information to receive a second subframe, where the second downlink control information includes a switching indication field of the second beam | S203 |

FIG. 2

| DCI | Field | Length | Function |
|---|---|---|---|
| First-order DCI | Second-order DCI resource configuration method | 11 | Indicates specific resource blocks used to transmit second-order DCI |
| | Antenna port | 2 | Indicates a specific antenna port being used |
| | Second-order DCI length | 2 | Indicates a specific quantity of bits of second-order DCI. If the field is "01", it indicates that the second-order DCI has 60 bits. If the field is "11", it indicates that the second-order DCI has 80 bits |
| Second-order DCI | Control information related to downlink data scheduling | 15 | Indicates a resource location, a bit rate, and a modulation scheme of data |
| | Control information related to multi-antenna transmission | 10 | Indicates a specific multi-antenna mechanism used for transmission |
| | Uplink resources | 5 | Indicates a reported time sequence and resource |
| | Retransmission-related control information | 5 | Indicates control over a retransmitted version |
| | Power control | 2 | |
| | Switching indication field | | Indicates indication information of controlling beam switching, which includes a beam number indication and may further include a time sequence indication |
| | Others | | |

FIG. 4

| Actually corresponding physical beam | MAC-CE beam group number 0 | MAC-CE beam group number 1 | MAC-CE beam group number 2 | MAC-CE beam group number 3 | MAC-CE beam group number 4 | MAC-CE beam group number 5 | MAC-CE beam group number 6 | MAC-CE beam group number 7 |
|---|---|---|---|---|---|---|---|---|
| Logical beam number 0 in DCI | Narrow beam 0 | Narrow beam 4 | Narrow beam 8 | Narrow beam 12 | Narrow beam 16 | Narrow beam 20 | Narrow beam 24 | Narrow beam 28 |
| Logical beam number 1 in DCI | Narrow beam 1 | Narrow beam 5 | Narrow beam 9 | Narrow beam 13 | Narrow beam 17 | Narrow beam 21 | Narrow beam 25 | Narrow beam 29 |
| Logical beam number 2 in DCI | Narrow beam 2 | Narrow beam 6 | Narrow beam 10 | Narrow beam 14 | Narrow beam 18 | Narrow beam 22 | Narrow beam 26 | Narrow beam 30 |
| Logical beam number 3 in DCI | Narrow beam 3 | Narrow beam 7 | Narrow beam 11 | Narrow beam 15 | Narrow beam 19 | Narrow beam 23 | Narrow beam 27 | Narrow beam 31 |

FIG. 8

BEAM SWITCHING METHOD AND RELATED DEVICE

CROSS-REFERENCE TO RELATED APPLICATIONS

This application is a continuation of International Application No. PCT/CN2017/118134, filed on Dec. 23, 2017, which claims priority to Chinese Patent Application No. 201710057296.4, filed on Jan. 26, 2017. The disclosures of the aforementioned applications are hereby incorporated by reference in their entireties.

TECHNICAL FIELD

The present invention relates to the field of wireless communications, and in particular, to a beam switching method and a related device.

BACKGROUND

In a beamforming (Beam Forming, BF) technology, a higher antenna array gain can be implemented by spatially facing a specific direction. In a 5th generation (5th-Generation, 5G) mobile communications technology, use of the beamforming technology for transmission is a key development direction. For example, a key research direction in high frequency (High Frequency, HF) communication is analog plus digital hybrid beamforming (Hybrid Beam Forming, HBF), so that not only a loss of a high frequency signal due to a transmission distance is reduced, but also complexity and hardware costs are controlled within an acceptable range.

Analog beamforming may be implemented by using a phase shifter, and a phase of a radio frequency (Radio frequency, RF) link is adjusted by using the phase shifter, so as to control a change in a direction of an analog beam. The analog beamforming has a characteristic that analog beams emitted from a same RF link can face only one direction at a same time. In an analog beam-based transmission environment, a scenario in which an analog beam used for communication between a base station and a terminal device (User Equipment, UE) changes may occur, and therefore, the analog beam needs to be switched, so that communication can adapt to the change of the analog beam.

In a solution 1 of the prior art, downlink control information (Downlink control information, DCI) may be used to indicate beam switching. There is a channel state information (Channel State Information, CSI)/beam state information (Beam State Information, BSI)/beam refinement information (Beam Refinement Information, BRI) request (request) field in the DCI, and a length of the field is three bits. When a value of the field is "001", the base station instructs the UE to report BSI; or when a value of the field is "010", the UE needs to measure a beam refinement reference signal (Beam Refinement Reference Signal, BRRS) and report BRI. In addition, there is a 1-bit field in the DCI, and the field is a beam switch indication (Beam switch indication) used to instruct the UE to switch a beam.

For example, if CSI/BSI/BRI request=001 (or 010) and Beam switch indication=1 in the DCI received by the UE, the UE needs to switch the beam, and the UE switches the beam at the beginning of an (n+kbeam-switch-delay-dic)$^{th}$ subframe. Because beams for reporting the BSI by the UE are in descending order of signal strength, the UE selects a first beam that is for reporting the BSI and with a strongest signal to switch the beam, where n is a subframe in which the UE reports the BSI, and kbeam-switch-delay-dic=11. It is assumed that the UE receives the DCI in a subframe n. In this case, the subframe in which the UE reports the BSI is n+4+m+l, where both m and l are notified by using other fields in the DCI, m is a transmission time offset (transmission time offset) of a channel state information-reference signal (Channel state information-reference signal, CSI-RS)/BRRS in downlink data, values of m are $\{0, 1, 2, $ and $3\}$, l is a transmission time offset of uplink data, values of l are $\{0, 1, \ldots, $ and $7\}$, and a sending period of the BRS may be (<5 ms, =5 ms, 10 ms, or 20 ms).

In a solution 2 of the prior art, a media access control-control element (Media Access Control-Control Element, MAC-CE) is used to indicate beam switching. The base station sends the MAC CE to the UE, and the MAC CE includes a 3-bit BRRS-RI and a 2-bit BR process index. The BRRS-RI is used to indicate a beam number, and the BR process index is used to indicate a BRRS process number. Four BR processes may be defined, a maximum of eight BRRS resources may be used in each BR process, and a maximum of eight antenna ports may be used for each BRRS resource.

For example, after the UE receives the MAC CE, the UE needs to switch a beam and adjust a serving beam to an indicated beam, and the UE switches the beam at the beginning of an (n+kbeamswitch-delay-mac)$^{th}$ subframe, where n is a time when the UE feeds back a hybrid automatic repeat request (Hybrid auto repeat request, HARQ) positive acknowledgement (Acknowledgement, ACK), and kbeam-switch-delay-mac=14. It is assumed that the UE receives the MAC-CE in a subframe n. In this case, a subframe in which uplink control information (including the HARQ ACK) is reported is n+4+k+m, where both m and l are notified by using other fields in the DCI, m is a transmission time offset of a CSI-RS/BRRS in downlink data, values of m are $\{0, 1, 2, $ and $3\}$, l is a transmission time offset of uplink data, values of l are $\{0, 1, \ldots, $ and $7\}$, and one, two, five, or 10 OFDM symbols may be occupied for transmitting one BRRS.

However, when beam switching is controlled by using the DCI, the UE is always instructed to switch to the first beam with a strongest signal. However, there is actually another available beam, and consequently flexibility of scheduling the beam switching is poor. A control latency of the MAC-CE is longer than a control latency of the DCI, and when the beam switching is controlled by using the MAC-CE, there is a problem that a latency is relatively long.

SUMMARY

Technical problems to be resolved in embodiments of the present invention are that flexibility of scheduling beam switching is poor and a beam control time is long, and a beam switching method and a related device are provided.

According to one aspect, an embodiment of the present invention provides a beam switching method, including: first receiving, by a terminal device, a first subframe sent by a base station by using a first beam, where the first subframe includes first-order downlink control information and second-order downlink control information; then searching for the second-order downlink control information based on the first-order downlink control information, where the first-order downlink control information includes location indication information of the second-order downlink control information in the first subframe; and finally, switching from the first beam to a second beam based on the found second-order downlink control information to receive a second subframe, where the second downlink control information includes a switching indication field of the second beam. Therefore, flexibility of beam switching is improved, load balancing of a control channel is implemented by using the two-order DCI to transfer load on the control channel to a data channel, and in comparison with using a MAC CE to indicate beam switching, using DCI to indicate beam switching reduces a latency of beam switching.

In a possible design, a time-frequency resource location of the second-order DCI may be determined based on a configuration field in the first-order DCI, then a length of the second-order DCI is determined based on a length field in the first-order DCI, and information about the length is decoded to obtain information about the second-order DCI.

In another possible design, a time interval between the first subframe and the second subframe is N subframes, and N is an integer greater than or equal to 0. Alternatively, a time interval between the first subframe and the second subframe is M milliseconds/microseconds.

In another possible design, N or M may be a fixed value or a semi-static value, and before the terminal device receives the first subframe sent by the base station by using the first beam, the terminal device may receive N or M notified by the base station by using a broadcast channel, a master system information block, or a system information block, or through radio resource control.

In another possible design, N may alternatively be a dynamically changing value, and the second-order downlink control information further includes indication information of N.

According to another aspect, an embodiment of the present invention provides a beam switching method, including:

first receiving, by a terminal device, a first subframe and a second subframe that are sent by a base station by using a first narrow beam within coverage of a first wide beam; and then switching from the first narrow beam within the coverage of the first wide beam to a second narrow beam within coverage of a second wide beam based on access control information in the first subframe and downlink control information in the second subframe to receive a third subframe, where the access control information includes switching configuration information of the second wide beam, and the downlink control information includes a switching indication field of the second narrow beam. Beam switching accuracy is improved in a manner of joint indication of beam switching.

In a possible implementation, the terminal device first searches, based on first-order downlink control information in the first subframe, for the access control information that is in a data channel and that is indicated by second-order downlink control information in the first subframe, and searches for second-order downlink control information in the second subframe based on first-order downlink control information in the second subframe, where the first-order downlink control information in the first subframe includes location indication information of the second-order downlink control information in the first subframe, and the first-order downlink control information in the second subframe includes location indication information of the second-order downlink control information in the second subframe.

In another possible implementation, the terminal device switches from the first narrow beam within the coverage of the first wide beam to the second narrow beam within the coverage of the second wide beam based on the found access control information that is in the data channel and that is indicated by the second-order downlink control information in the first subframe, and the found second-order downlink control information in the second subframe.

In another possible implementation, the terminal device may search for the second narrow beam within the coverage of the second wide beam from a preset beam mapping table based on the switching configuration information and the location indication information.

In another possible implementation, before the terminal device receives the first subframe and the second subframe that are sent by the base station, the terminal device may receive the beam mapping table sent by the base station by using a broadcast channel, or through radio resource control, or the like.

In another possible implementation, the terminal device may first determine a time-frequency resource location of the second-order DCI in the first subframe based on a configuration field in the first-order DCI in the first subframe, determine a length of the second-order DCI in the first subframe based on a length field in the first-order DCI in the first subframe, and decode information about the length to obtain information about the second-order DCI in the first subframe.

In another possible implementation, the terminal device may determine a time-frequency resource location of the second-order DCI in the second subframe based on a configuration field in the first-order DCI in the second subframe, determine a length of the second-order DCI in the second subframe based on a length field in the first-order DCI in the second subframe, and decode information about the length to obtain information about the second-order DCI in the second subframe.

In another possible implementation, a time interval between the first subframe and the third subframe is M subframes, a time interval between the second subframe and the third subframe is N subframes, and M and N are integers greater than or equal to 0.

In another possible implementation, N is a fixed value or a semi-static value, M is a fixed value or a semi-static value, and before the terminal device receives the first subframe sent by the base station by using the first beam, the terminal device may receive N and/or M notified by the base station by using a broadcast channel, a master system information block, or a system information block, or through radio resource control.

In another possible implementation, N is a dynamically changing value, and the second-order downlink control information in the first subframe further includes indication information of M; and/or N is a dynamically changing value, and the second-order downlink control information in the third subframe further includes indication information of N.

According to another aspect, an embodiment of the present invention provides a beam switching method, including:

first receiving, by a terminal device, a first subframe sent by a base station by using a first beam, where the first subframe includes downlink control information; and then switching from the first beam to a second beam based on the downlink control information to receive a second subframe, where the downlink control information includes a switching indication field of the second beam, the switching indication field includes a beam number, and the beam number is a quantity of bits of a preset length, so that a latency of beam switching is reduced by using DCI to indicate beam switching.

In a possible design, a beam number indicating beam switching is newly added to second-order DCI, and the beam number may be a quantity of bits of a preset length.

In another possible implementation, N may be a fixed value or a semi-static value, and before the terminal device receives the first subframe sent by the base station by using the first beam, the terminal device may receive N notified by the base station by using a broadcast channel, a master system information block, or a system information block, or through radio resource control.

In another possible implementation, N may alternatively be a dynamically changing value, and the second-order downlink control information further includes indication information of N.

According to another aspect, an embodiment of the present invention provides a beam switching method, including:

sending, by a base station, a first subframe to a terminal device by using a first beam, where the first subframe includes first-order downlink control information and second-order downlink control information, the first-order downlink control information includes location indication information of the second-order downlink control information in the first subframe, and the second downlink control information includes a switching indication field of a second beam; and after receiving the first subframe, switching, by the terminal device, from the first beam to the second beam to receive a second subframe, so that flexibility of beam switching is improved, load balancing of a control channel is implemented by using the two-order DCI to transfer load on the control channel to a data channel, and in comparison with using a MAC CE to indicate beam switching, using DCI to indicate beam switching reduces a latency of beam switching.

In a possible implementation, the switching indication field includes a beam number, and the beam number is a quantity of bits of a preset length.

In another possible implementation, a time interval between the first subframe and the second subframe is N subframes, and N is an integer greater than or equal to 0.

In another possible implementation, N is a fixed value or a semi-static value, and before the base station sends the first subframe to the terminal device by using the first beam, the base station sends N to the terminal device by using a broadcast channel, a master system information block, or a system information block, or through radio resource control.

In another possible implementation, N is a dynamically changing value, and the second-order downlink control information further includes indication information of N.

According to another aspect, an embodiment of the present invention provides a beam switching method, including:

sending, by a base station, a first subframe and a second subframe to a terminal device by using a first narrow beam within coverage of a first wide beam; and after receiving the first subframe and the second subframe, switching, by the terminal device, from the first narrow beam within the coverage of the first wide beam to a second narrow beam within coverage of a second wide beam based on access control information in the first subframe and downlink control information in the second subframe to receive a third subframe, where the access control information includes switching configuration information of the second wide beam, and the downlink control information includes a switching indication field of the second narrow beam. Beam switching accuracy is improved in a manner of joint indication of beam switching.

In a possible implementation, before the base station sends the first subframe and the second subframe to the terminal device by using the first narrow beam within the coverage of the first wide beam, the base station sends a preset beam mapping table to the terminal device by using a broadcast channel.

In another possible implementation, the switching indication field includes a beam number, the beam number is a quantity of bits of a first preset length, the access control information includes a beam group number, and the beam group number is a quantity of bits of a second preset length.

In another possible implementation, a time interval between the first subframe and the third subframe is M subframes, a time interval between the second subframe and the third subframe is N subframes, and M and N are integers greater than or equal to 0.

In another possible implementation, before the base station sends the first subframe and the second subframe to the terminal device by using the first narrow beam within the coverage of the first wide beam, the base station sends N and/or M to the terminal device by using a broadcast channel, a master system information block, or a system information block, or through radio resource control.

In another possible implementation, N is a dynamically changing value, and second-order downlink control information in the first subframe further includes indication information of M; and/or N is a dynamically changing value, and second-order downlink control information in the third subframe further includes indication information of N.

According to another aspect, an embodiment of the present invention provides a beam switching method, including:

first sending, by a base station, a first subframe to a terminal device by using a first beam, where the first subframe includes downlink control information; and after receiving the first subframe, switching, by the terminal device, from the first beam to a second beam based on the downlink control information to receive a second subframe, where the downlink control information includes a switching indication field of the second beam, so that a latency of beam switching is reduced by using the DCI to indicate beam switching.

In another possible implementation, the switching indication field includes a beam number, and the beam number is a quantity of bits of a preset length.

In another possible implementation, a time interval between the first subframe and the second subframe is N subframes, and N is an integer greater than or equal to 0.

In another possible implementation, N is a fixed value or a semi-static value, and before the terminal device receives the first subframe sent by the base station by using the first beam, the base station sends N to the terminal device by using a broadcast channel, a master system information block, or a system information block, or through radio resource control.

In another possible implementation, N is a dynamically changing value, and second-order downlink control information further includes indication information of N.

According to another aspect, this application provides a terminal device, and the terminal device is configured to implement the method and the function that are performed by the foregoing terminal device, and is implemented by hardware/software, where the hardware/software includes a unit corresponding to the function.

According to another aspect, this application provides a base station, and the base station is configured to implement the method and the function that are performed by the foregoing base station, and is implemented by hardware/software, where the hardware/software includes a unit corresponding to the function.

According to another aspect, this application provides a beam switching device, including a processor, a memory, and a communications bus. The communications bus is configured to implement connection and communication between the processor and the memory, and the processor executes a program stored in the memory, to implement the steps in the beam switching method provided above.

According to another aspect, this application provides a beam switching device, including a processor, a memory, and a communications bus. The communications bus is configured to implement connection and communication between the processor and the memory, and the processor executes a program stored in the memory, to implement the steps in the beam switching method provided above.

BRIEF DESCRIPTION OF DRAWINGS

To describe the technical solutions in the embodiments of the present invention or in the background more clearly, the following describes the accompanying drawings required for describing the embodiments of the present invention or the background.

FIG. 1 is a schematic structural diagram of a beam switching system according to an embodiment of the present invention;

FIG. 2 is a schematic flowchart of a beam switching method according to an embodiment of the present invention;

FIG. 4 is a schematic diagram of DCI configuration information according to an embodiment of the present invention;

FIG. 8 is a schematic diagram of a beam mapping table according to an embodiment of the present invention;

DESCRIPTION OF EMBODIMENTS

Figure 3A:
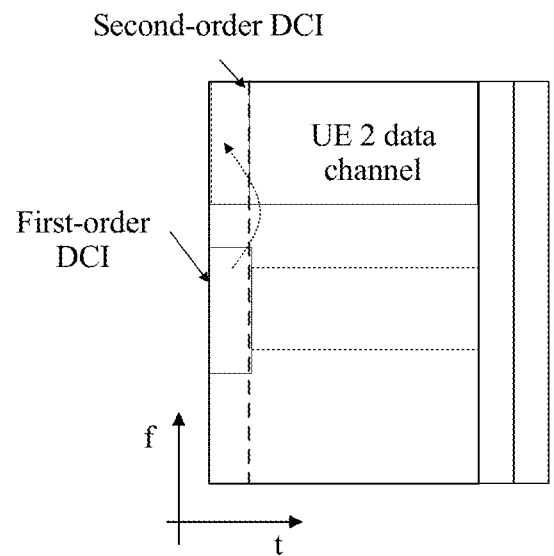
FIG. 3(A) is a schematic structural diagram of locations of one type of two-order DCI according to an embodiment of the present invention.

The following describes the embodiments of the present invention with reference to the accompanying drawings in the embodiments of the present invention.

The terms "first" and "second" in the embodiments of the present invention are merely intended for a purpose of description, and shall not be understood as an indication or implication of relative importance or implicit indication of a quantity of indicated technical features. Therefore, a feature restricted by "first" or "second" may explicitly or implicitly include one or more features.

FIG. 1 is a schematic structural diagram of a beam switching system according to an embodiment of the present invention. The beam switching system includes a base station and a terminal device. A plurality of available analog beams are maintained between the base station and the terminal device for communication. In addition, the base station may use single-order DCI or two-order DCI to instruct UE to switch a beam. The single-order DCI or the two-order DCI exists independently, and when accessing a network, the UE already knows a type of DCI used in the current network.

The terminal device in this embodiment of the present invention may be referred to as an access terminal, a subscriber unit, a subscriber station, a mobile station, a mobile console, a remote station, a remote terminal, a mobile device, a user terminal, a terminal, a wireless communications device, a user agent, or a user apparatus. The access terminal may be a cellular phone, a cordless phone, a session initiation protocol (Session Initiation Protocol, SIP) phone, a wireless local loop (Wireless Local Loop, WLL) station, a personal digital assistant (Personal Digital Assistant, PDA), a handheld device having a wireless communication function, a computing device, another processing device connected to a wireless modem, an in-vehicle device, a wearable device, a terminal device in a future 5G network, or the like.

The base station in this embodiment of the present invention may be a base transceiver station (Base Transceiver Station, BTS) in a global system for mobile communications (Global System for Mobile Communication, GSM) system or a code division multiple access (Code Division Multiple Access, CDMA) system, or may be a NodeB (NodeB, NB) in a WCDMA system, or may be an evolved NodeB (Evolutional Node B, ENB) in an LTE system. Alternatively, the base station may be a relay node, an access point, an in-vehicle device, or a wearable device, or may be a wireless fidelity (Wireless-Fidelity, Wi-Fi) station, or may be a base station in next-generation communication, such as a 5G radio access network device (New Radio, NR, or referred to as a "new radio technology", a base station, a small cell, or a micro cell).

FIG. 2 is a schematic flowchart of a beam switching method according to an embodiment of the present invention. In this embodiment of the present invention, two-order DCI is used to indicate beam switching. The method includes but is not limited to the following steps.

S201. A terminal device receives a first subframe sent by a base station by using a first beam, where the first subframe includes first-order downlink control information and second-order downlink control information.

In one implementation, a plurality of available analog beams are maintained between the base station and the terminal device. For example, the base station and the terminal device perform downlink data transmission by using an analog beam 1. When the analog beam 1 is no longer applicable because the terminal device moves, the base station determines, based on a channel measurement result and a channel scheduling result, that the analog beam 1 serving the terminal device needs to be switched. Therefore, to instruct the terminal device in a timely manner to perform beam switching, the base station may send the first subframe to the terminal device by using the first beam.

Figure 3B:
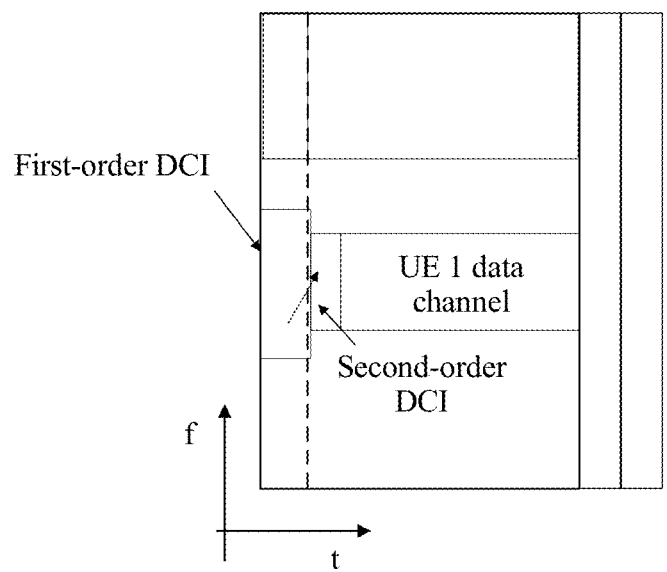
FIG. 3(B) is a schematic structural diagram of locations of another type of two-order DCI according to an embodiment of the present invention.

In this embodiment of the present invention, the two-order DCI is used to instruct the terminal device to perform the beam switching. The first-order DCI is sent on a physical downlink control channel (Physical downlink control channel, PDCCH), and the second-order DCI may be sent at a resource location of the PDCCH or at a resource location of a physical downlink data channel (Physical downlink shared channel, PDSCH). As shown in FIG. 3(A) and FIG. 3(B), the first-order DCI is located at a beginning location of a subframe, and may be located at a same location as single-order DCI of LTE, and the second-order DCI may be located at a resource location on a control channel (such as second-order DCI of UE 2 in FIG. 3(A)) or at a resource location on a data channel (such as second-order DCI of UE 1 in FIG. 3(B)). The first-order DCI has a fixed size, may include at least indications of a location and a size of the second-order DCI, and may further include some data decoding information. The second-order DCI has a variable size and may include other required control information.

It should be noted that because there are many defined DCI formats, the UE needs to attempt to decode DCI according to a length of the DCI. The two-order DCI is used, the first-order DCI has a fixed length, and the second-order DCI does not require blind detection because the second-order DCI is already indicated in the first-order DCI. Complexity of the blind detection is reduced in comparison with the single-order DCI. In addition, the second-order DCI may be transmitted at the resource location on the data channel. In this way, a resource of the control channel is saved and may be used to control more UEs. Therefore, the two-order DCI actually transfers load of the control channel to the data channel, thereby maintaining load balancing of resources of the control channel.

S202. The terminal device searches for the second-order downlink control information based on the first-order downlink control information, where the first-order downlink control information includes location indication information of the second-order downlink control information in the first subframe.

In one implementation, a time-frequency resource location of the second-order DCI may be determined based on a configuration field in the first-order DCI, then a length of the second-order DCI is determined based on a length field in the first-order DCI, and information about the length is decoded to obtain information about the second-order DCI.

As shown in FIG. 4, a "second-order DCI resource configuration method" and a "second-order DCI length" are predefined in the first-order DCI. The terminal device may find, in the "second-order DCI resource configuration method" in the first-order DCI, a resource block used to transmit the second-order DCI, and then determine the length of the second-order DCI in the "second-order DCI length" in the first-order DCI, so as to decode the information about the length to obtain the information about the second-order DCI.

S203. The terminal device switches from the first beam to a second beam based on the found second-order downlink control information to receive a second subframe, where the second downlink control information includes a switching indication field of the second beam.

In one implementation, the second-order DCI includes a switching indication field, and the switching indication field instructs the terminal device to switch to a beam X. The beam X may be a beam with strongest signal strength, or may be a beam with weakest signal strength, or may be a beam with other signal strength. The base station may select a beam with different signal strength each time to instruct the terminal device to perform beam switching. A beam number indicating beam switching is newly added to the second-order DCI, and the beam number may be a quantity of bits of a preset length. For example, there are a total of N=8 analog beams $\{0, 1, \ldots, $ and 7$\}$ in a system, and in this case, a length of the switching indication field is three bits. When a second-order DCI field decoded by the UE is "010", the terminal device switches to a third analog beam; or if a second-order DCI field decoded by the UE is "111", the terminal device switches to an eighth analog beam.

A time interval between the first subframe and the second subframe is N subframes, and N is an integer greater than or equal to 0. Alternatively, a time interval between the first subframe and the second subframe is M milliseconds/microseconds, and M is a number greater than or equal to 0. N or M may be a fixed value or a semi-static value, and before the terminal device receives the first subframe sent by the base station by using the first beam, the terminal device may receive N or M notified by the base station by using a broadcast channel, a master system information block, or a system information block, or through radio resource control.

In some embodiments, N may alternatively be a dynamically changing value, and the second-order downlink control information further includes indication information of N. Another field may be added to the second-order DCI. The field is used to identify a switching time sequence and dynamically notify the UE of a time of switching a beam. To be specific, if the UE receives a beam switch indication in an $n^{th}$ subframe, the UE starts switching the beam in an $(n+k)^{th}$ subframe, for example, k=$\{0, 1, \ldots, $ and 7$\}$, and if the UE obtains through decoding that the field is "111", the UE starts switching the beam in an $(n+7)^{th}$ subframe.

Figure 5:
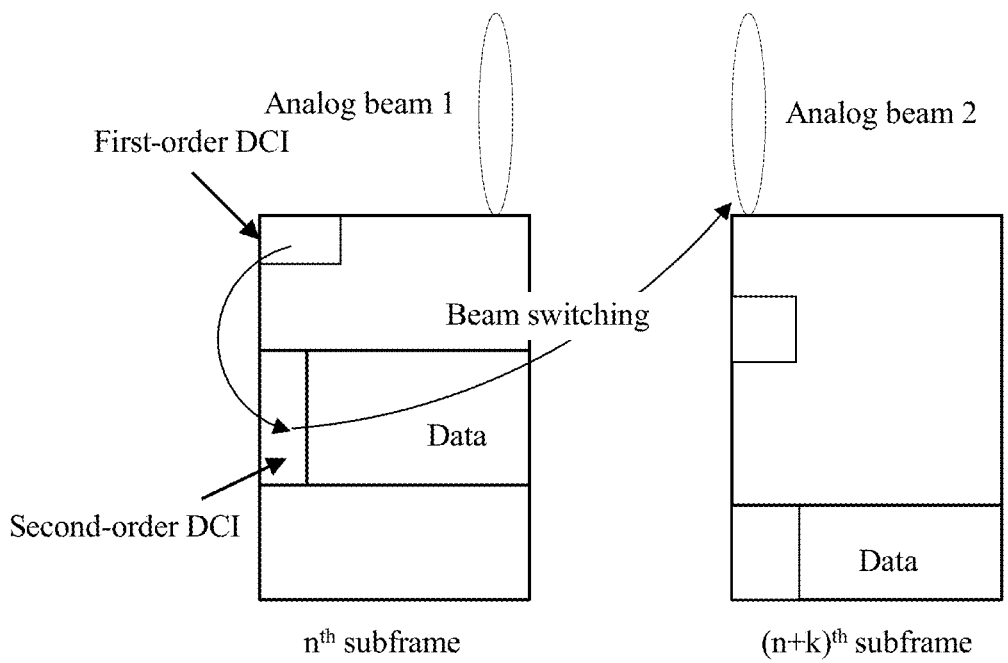
FIG. 5 is a schematic diagram of one type of beam switching according to an embodiment of the present invention.

In conclusion, FIG. 5 is a schematic diagram of one type of beam switching according to an embodiment of the present invention. In an $n^{th}$ subframe, a base station and UE perform communication by using an analog beam 1. The terminal device first finds second-order DCI based on first-order DCI, and then switches from the analog beam 1 to an analog beam 2 based on a switching indication field in the second-order DCI, so that the base station and the UE perform communication by using the analog beam 2 in an $(n+k)^{th}$ subframe. Therefore, flexibility of beam switching is improved, load balancing of a control channel is implemented by using the two-order DCI to transfer load on the control channel to a data channel, and in comparison with using a MAC CE to indicate beam switching, using DCI to indicate beam switching reduces a latency of beam switching.

Figure 6:
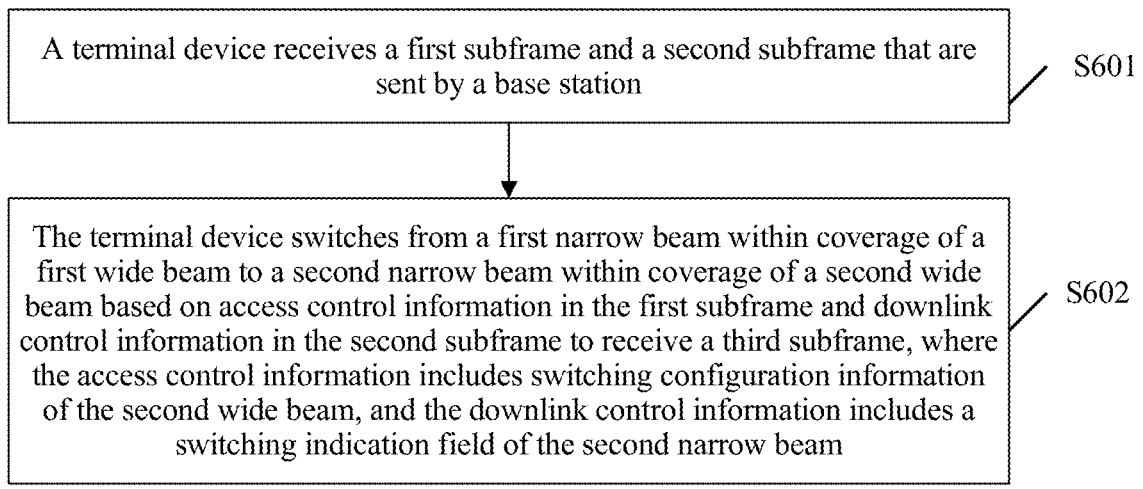
FIG. 6 is a schematic flowchart of another beam switching method according to an embodiment of the present invention.

FIG. 6 is a schematic flowchart of a beam switching method according to an embodiment of the present invention. Because a wide beam has relatively large coverage, the wide beam that can cover UE changes relatively slowly. Because a narrow beam has relatively small coverage, the narrow beam that can serve UE may change relatively fast. Therefore, a manner of joint indication of beam switching is used in this embodiment of the present invention, and includes the following steps.

S601. A terminal device receives a first subframe and a second subframe that are sent by a base station.

In one implementation, a plurality of available analog beams are maintained between the base station and the terminal device. For example, when an analog beam 1 is no longer applicable because the terminal device moves, the base station determines, based on a channel measurement result and a channel scheduling result, that the analog beam 1 serving the terminal device needs to be switched. Therefore, to instruct the terminal device in a timely manner to perform beam switching and reduce resource overheads, the base station may first send the first subframe and the second subframe to the terminal device by using a first narrow beam within coverage of a first wide beam.

Figure 7:
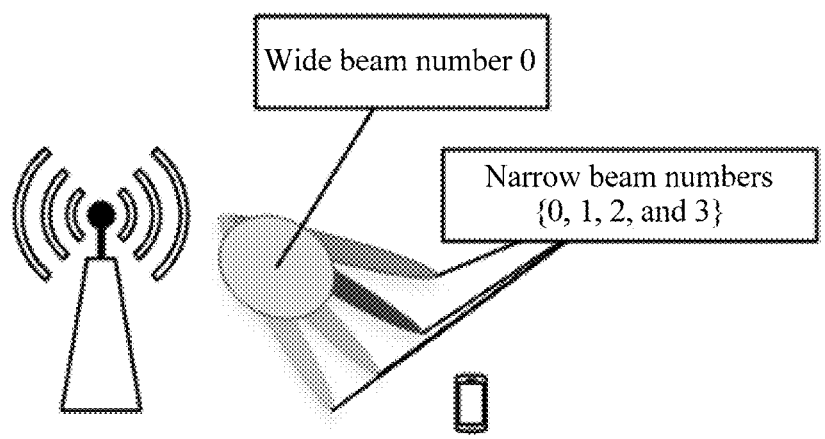
FIG. 7 is a schematic diagram of beam coverage according to an embodiment of the present invention.

It should be noted that if an analog beam is relatively narrow in a system, a total quantity N of analog beams is relatively large, a quantity of bits of a beam number is relatively large, and relatively high overheads are caused. Therefore, narrow beams may be grouped. Narrow beams that can cover a continuous space range may be grouped as a wide beam (also referred to as a beam group), or narrow beams that cover a discontinuous space range may be grouped as a wide beam (also referred to as a beam group). The wide beam may be a physical concept that really exists, that is, a beam that can really be used in the system; or may be a logical concept, that is, there is no real physical wide beam in the system, but a logical representation of a group of narrow beams. FIG. 7 is a schematic diagram of beam coverage according to an embodiment of the present invention. There may be 32 narrow beams and eight wide beams in a cell served by a base station (only one wide beam and four narrow beams covered by the wide beam are depicted in the figure), and coverage of each wide beam may be a set of coverage of more than four narrow beams.

S602. The terminal device switches from a first narrow beam within coverage of a first wide beam to a second narrow beam within coverage of a second wide beam based on access control information in the first subframe and downlink control information in the second subframe to receive a third subframe, where the access control information includes switching configuration information of the second wide beam, and the downlink control information includes a switching indication field of the second narrow beam. The switching indication field includes a beam number, the beam number is a quantity of bits of a first preset length, the access control information includes a beam group number, and the beam group number is a quantity of bits of a second preset length. The access control information may be MAC CE information.

In one implementation, the terminal device first searches, based on the first-order downlink control information in the first subframe, for the access control information that is in a data channel and that is indicated by the second-order downlink control information in the first subframe, and searches for the second-order downlink control information in the second subframe based on the first-order downlink control information in the second subframe, where the first-order downlink control information in the first subframe includes location indication information of the second-order downlink control information in the first subframe, and the first-order downlink control information in the second subframe includes location indication information of the second-order downlink control information in the second subframe. Then, the terminal device switches from the first narrow beam within the coverage of the first wide beam to the second narrow beam within the coverage of the second wide beam based on the found access control information that is in the data channel and that is indicated by the second-order downlink control information in the first subframe, and the found second-order downlink control information in the second subframe. Specifically, the second narrow beam within the coverage of the second wide beam may be searched for from a preset beam mapping table based on the switching configuration information and the location indication information.

In some embodiments, before the terminal device receives the first subframe and the second subframe that are sent by the base station, the terminal device may receive the beam mapping table sent by the base station by using a broadcast channel, or through radio resource control, or the like. The base station may send the beam mapping table to the terminal device when the terminal device accesses a network, so that the beam mapping table is visible to both the base station and the terminal device.

Further, the terminal device may first determine a time-frequency resource location of the second-order DCI in the first subframe based on a configuration field in the first-order DCI in the first subframe, determine a length of the second-order DCI in the first subframe based on a length field in the first-order DCI in the first subframe, and decode information about the length to obtain information about the second-order DCI in the first subframe. Then, the terminal device determines information such as a time-frequency resource location, a transmission mode, or a modulation and coding scheme of data in the first subframe based on a configuration field in the second-order DCI in the first subframe, obtains data information in the first subframe through decoding, and obtains a MAC-CE from the data information.

As shown in FIG. 4, a "second-order DCI resource configuration method" and a "second-order DCI length" are predefined in the first-order DCI. The terminal device may find, in the "second-order DCI resource configuration method" in the first-order DCI, a resource block used to transmit the second-order DCI, and then determine the length of the second-order DCI in the "second-order DCI length" in the first-order DCI, so as to decode the information about the length to obtain the information about the second-order DCI. "Control information related to downlink data scheduling" and "control information related to multi-antenna transmission" are defined in the second-order DCI, and the terminal device may obtain, at the time-frequency resource location indicated by the second-order DCI, data information through decoding by using information such as a transmission mode and a modulation and coding scheme indicated by the second-order DCI, and obtain MAC-CE information from the data information. The MAC-CE information includes the switching configuration information of the second wide beam, and the switching configuration information instructs the terminal device to switch to a wide beam of a beam group numbered X.

In some embodiments, after the UE receives, in an $n^{th}$ subframe, MAC-CE information that is sent by the base station and that indicates switching to a wide beam, the UE performs the switching to the wide beam in an $(n+k2)^{th}$ subframe, and selects a narrow beam within coverage of the wide beam to perform switching. For example, during the switching to the wide beam, a number of the wide beam is selected based on the MAC-CE information, and a logical number of the narrow beam remains unchanged. Alternatively, a number of the wide beam is selected based on the MAC-CE information, and a narrow beam with a logical number 0 is selected. However, specific implementation is not limited to the foregoing two manners.

It should be noted that DCI is control information at a physical layer (layer 1), and a MAC-CE is control information at a MAC layer (layer 2). The MAC-CE is actually a bit sequence, a plurality of fields are defined in the MAC-CE, and each field is used to control a specific function. MAC-CE information is transmitted on the data channel, and therefore, the MAC-CE information is carried in data. On a base station side, the MAC-CE is first encapsulated into data, and the data is sent on a specific time-frequency resource in a form of an electromagnetic wave after channel coding, amplitude modulation, and waveform modulation. After receiving the electromagnetic wave, the UE receives the data channel at a specific time-frequency resource location, and obtains an original bit sequence of the MAC-CE by performing a series of decoding processes such as demodulation, channel decoding, and decapsulation opposite to processes on the base station side. The UE performs a corresponding operation according to an instruction of each field and a requirement of the base station. Unlike the DCI, the MAC-CE needs to be encapsulated into data of the layer 1 when the MAC-CE is to be sent, and when the data is to be received, the data needs to be first received at the layer 1 and then decapsulated and interpreted at the layer 2. Therefore, a control latency of the MAC-CE is longer than a control latency of the DCI.

Further, the terminal device may determine a time-frequency resource location of the second-order DCI in the second subframe based on a configuration field in the first-order DCI in the second subframe, determine a length of the second-order DCI in the second subframe based on a length field in the first-order DCI in the second subframe, and decode information about the length to obtain information about the second-order DCI in the second subframe. The second-order DCI in the second subframe includes a switching indication field, and the switching indication field instructs the terminal device to switch to a narrow beam with a logical number Y.

As shown in FIG. 4, a "second-order DCI resource configuration method" and a "second-order DCI length" are predefined in the first-order DCI. The terminal device may find, in the "second-order DCI resource configuration method" in the first-order DCI, a resource block used to transmit the second-order DCI, and then determine the length of the second-order DCI in the "second-order DCI length" in the first-order DCI, so as to decode the information about the length to obtain the information about the second-order DCI. Indication information for controlling beam switching is newly added to the second-order DCI, and the indication information may include a beam number indication. For example, there are a total of N=8 analog narrow beams {0, 1, . . . , and 7} in a system, and in this case, a length of the switching indication field is three bits. When a second-order DCI field decoded by the UE is "010", the terminal device switches to a third analog narrow beam; or if a second-order DCI field decoded by the UE is "111", the terminal device switches to an eighth analog narrow beam.

For example, FIG. 8 is a schematic diagram of a correspondence that is between a beam number in a MAC-CE and a beam number in DCI and that is pre-agreed between the base station and the terminal device. If the MAC-CE indicates a beam group number 2, and the DCI indicates a logical beam number 0, the terminal device switches to a narrow beam 0 within coverage of a wide beam 2, namely, a physical narrow beam 8. If the MAC-CE indicates a beam group number 7, and the DCI indicates a logical beam number 3, the terminal device switches to a narrow beam 7 within coverage of a wide beam 3, namely, a physical narrow beam 31.

A time interval between the first subframe and the third subframe is M subframes, a time interval between the second subframe and the third subframe is N subframes, and M and N are integers greater than or equal to 0. N is a fixed value or a semi-static value, M is a fixed value or a semi-static value, and before the terminal device receives the first subframe sent by the base station by using the first beam, the terminal device may receive N and/or M notified by the base station by using a broadcast channel, a master system information block, or a system information block, or through radio resource control.

In some embodiments, N is a dynamically changing value, and the second-order downlink control information in the first subframe further includes indication information of M; and/or N is a dynamically changing value, and the second-order downlink control information in the third subframe further includes indication information of N. Another field may be added to the second-order DCI. The field is used to identify a switching time sequence and dynamically notify the UE of a time of switching a beam. To be specific, if the UE receives a beam switch indication in an $n^{th}$ subframe, the UE starts switching the beam in an $(n+k)^{th}$ subframe, for example, k={0, 1, . . . , and 7}, and if the UE obtains through decoding that the field is "111", the UE starts switching the beam in an $(n+7)^{th}$ subframe.

Figure 9:
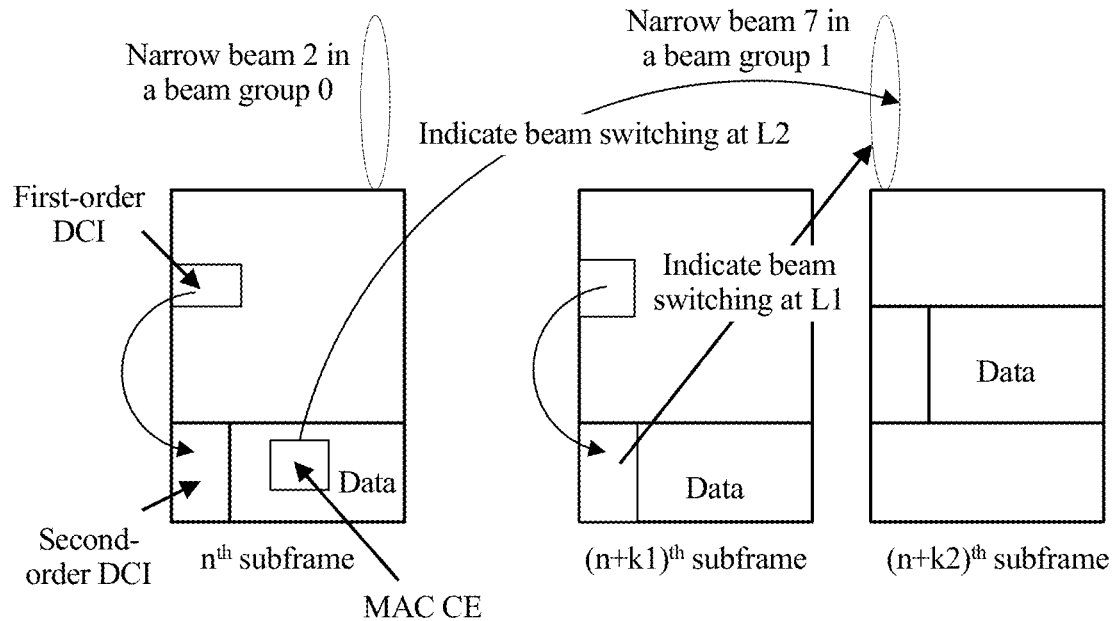
FIG. 9 is a schematic diagram of another type of beam switching according to an embodiment of the present invention.

For a manner of joint indication of beam switching by using a mapping relationship between a layer L1 and a layer L2, FIG. 9 is a schematic diagram of one type of beam switching. In an $n^{th}$ subframe, the base station and the UE perform communication by using a narrow beam 2 in a beam group 0, MAC-CE information is found by using two-order DCI, and it is determined that the terminal device needs to switch to a beam group 1. In an $(n+k1)^{th}$ subframe, the base station and the UE perform communication also by using the narrow beam 2 in the beam group 0, second-order DCI is found by using first-order DCI, and it is determined that the terminal device needs to switch to a narrow beam 7. Finally, by jointly using two types of indication information, the terminal device switches from the narrow beam 2 in the beam group 0 to the narrow beam 7 in the beam group 1, and in an $(n+k2)^{th}$ subframe, the base station and the UE perform communication by using the narrow beam 7 in the beam group 1. In particular, in a time relationship, k1=k2−k, where k1 is a length of a time from receiving, by the UE, a MAC-CE configuration that requires beam switching to receiving DCI that indicates the beam switching, k is a length of a time from receiving, by the UE, the DCI that indicates the beam switching to switching a beam, k2 is a length of a time from receiving, by the UE, the MAC-CE configuration that requires the beam switching to switching the beam, and usually, k is less than k2.

It should be noted that the first subframe and the second subframe are not limited in an order of a receiving time. The first subframe may be first received, wide beam switching is indicated based on the access control information in the first subframe, then the second subframe is received, and narrow beam switching is indicated based on the DCI information in the second subframe, thereby completing the joint indication of the beam switching. Alternatively, the second subframe may be first received, narrow beam switching is indicated based on the DCI information in the second subframe, then the first subframe is received, and wide beam switching is indicated based on the access control information in the first subframe, thereby completing the joint indication of the beam switching.

In this embodiment of the present invention, the access control information is not limited to the MAC CE information at the layer L2, but may further include an RRC IE at a layer L3. A specific implementation of a manner in which beam switching is jointly indicated by using the DCI and the RRC IE is similar to a manner in which the beam switching is jointly indicated by using the DCI and the MAC CE. Details are not described in this embodiment of the present invention again.

Figure 10:
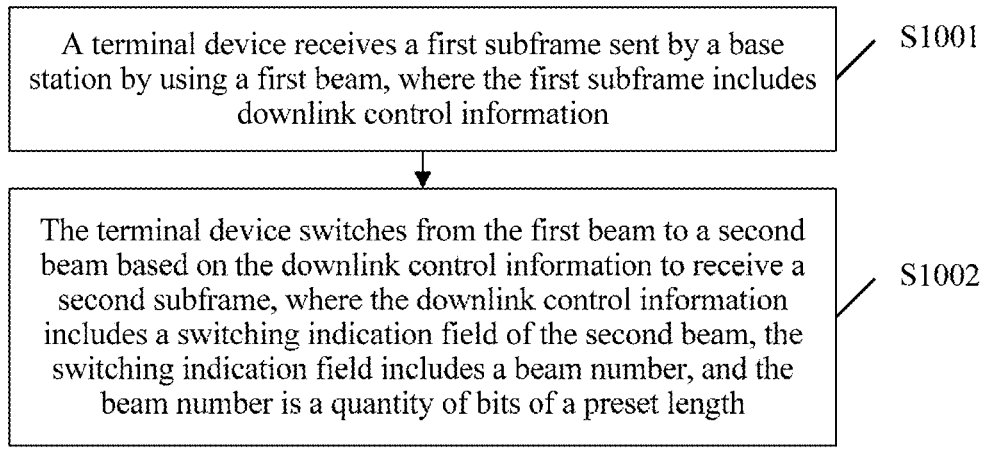
FIG. 10 is a schematic flowchart of still another beam switching method according to an embodiment of the present invention.

FIG. 10 is a schematic flowchart of a beam switching method according to an embodiment of the present invention. In this embodiment of the present invention, single-order DCI is used to indicate beam switching. The method includes but is not limited to the following steps.

S1001. A terminal device receives a first subframe sent by a base station by using a first beam, where the first subframe includes downlink control information.

In specific implementation, a plurality of available analog beams are maintained between the base station and the terminal device. For example, the base station and the terminal device perform downlink data transmission by using an analog beam 1. When the analog beam 1 is no longer applicable because the terminal device moves, the base station determines, based on a channel measurement result and a channel scheduling result, that the analog beam 1 serving the terminal device needs to be switched. Therefore, to instruct the terminal device in a timely manner to perform beam switching, the base station may send the first subframe to the terminal device by using the first beam.

S1002. The terminal device switches from the first beam to a second beam based on the downlink control information to receive a second subframe, where the downlink control information includes a switching indication field of the second beam.

In one implementation, the DCI includes a switching indication field, and the switching indication field instructs the terminal device to switch to a beam X. A beam number indicating beam switching is newly added to second-order DCI, and the beam number may be a quantity of bits of a preset length. For example, there are a total of N=8 analog beams {0, 1, . . . , and 7} in a system, and in this case, a length of the switching indication field is three bits. When a second-order DCI field decoded by the UE is "010", the terminal device switches to a third analog beam; or if a second-order DCI field decoded by the UE is "111", the terminal device switches to an eighth analog beam.

In some embodiments, a time interval between the first subframe and the second subframe is N subframes, and N is an integer greater than or equal to 0. N may be a fixed value or a semi-static value, and before the terminal device receives the first subframe sent by the base station by using the first beam, the terminal device may receive N notified by the base station by using a broadcast channel, a master system information block, or a system information block, or through radio resource control.

In some embodiments, N may alternatively be a dynamically changing value, and the second-order downlink control information further includes indication information of N. Another field may be added to the DCI. The field is used to identify a switching time sequence and dynamically notify the UE of a time of switching a beam. To be specific, if the UE receives a beam switch indication in an $n^{th}$ subframe, the UE starts switching the beam in an $(n+k)^{th}$ subframe, for example, k={0, 1, . . . , and 7}, and if the UE obtains through decoding that the field is "111", the UE starts switching the beam in an $(n+7)^{th}$ subframe.

Figure 11:
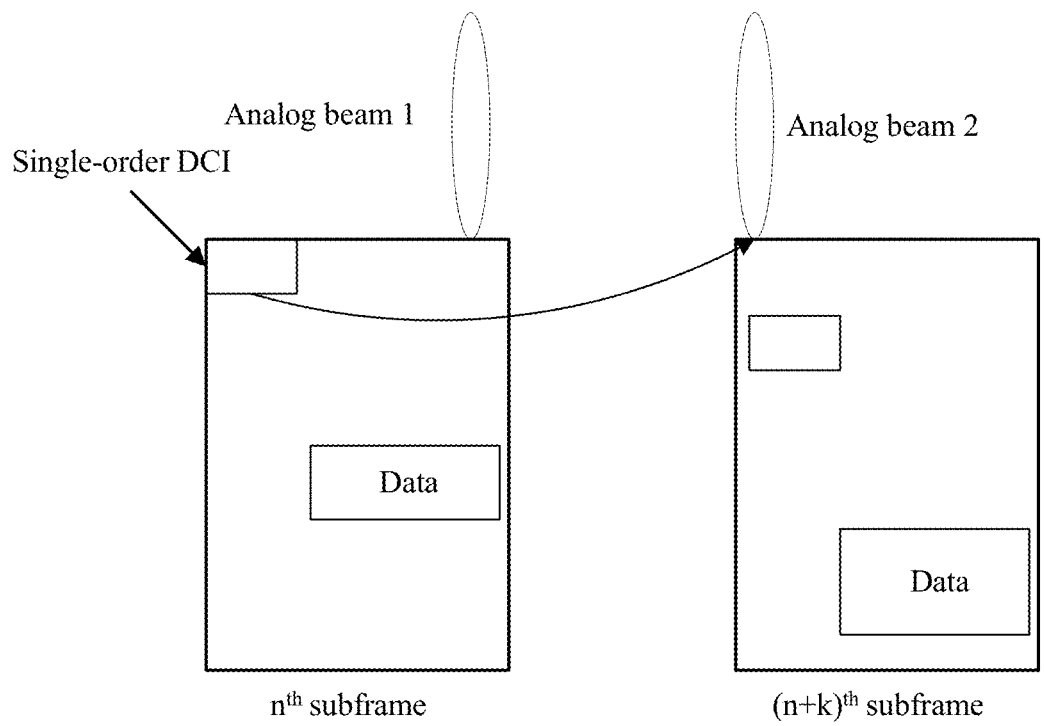
FIG. 11 is a schematic diagram of still another type of beam switching according to an embodiment of the present invention.

In conclusion, FIG. 11 is a schematic diagram of one type of beam switching according to an embodiment of the present invention. In an $n^{th}$ subframe, a base station and UE perform communication by using an analog beam 1. The terminal device first switches from the analog beam 1 to an analog beam 2 based on a switching indication field in DCI, so that the base station and the UE perform communication by using the analog beam 2 in an $(n+k)^{th}$ subframe, and a latency of beam switching is reduced by using DCI to indicate beam switching.

Figure 12:
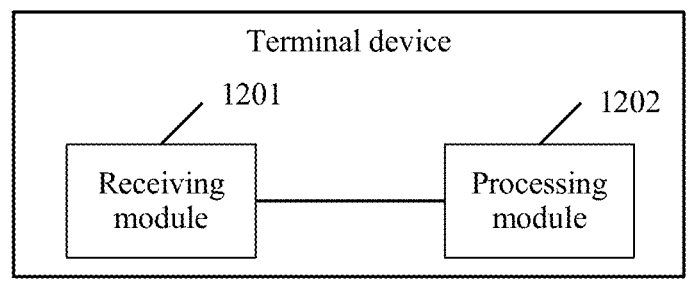
FIG. 12 is a schematic structural diagram of a terminal device according to an embodiment of the present invention.

FIG. 12 is a schematic structural diagram of a terminal device according to an embodiment of the present invention. As shown in the figure, the terminal device includes a receiving module 1201 and a processing module 1202. The receiving module 1201 and the processing module 1202 perform the method and the function that are performed by the terminal device in the foregoing embodiment, including: The receiving module 1201 is configured to receive a first subframe sent by a base station, and the processing module 1202 is configured to: search for second-order downlink control information based on first-order downlink control information in the first subframe, and switch from a first beam to a second beam based on the found second-order downlink control information. Alternatively, the receiving module 1201 is configured to receive a first subframe and a second subframe that are sent by a base station, and the processing module 1202 is configured to switch from a first narrow beam within coverage of a first wide beam to a second narrow beam within coverage of a second wide beam based on access control information in the first subframe and downlink control information in the second subframe. Alternatively, the receiving module 1201 is configured to receive a first subframe sent by a base station, and the processing module 1202 is configured to switch from a first beam to a second beam based on downlink control information to receive a second subframe. A specific implementation is not described in this embodiment of the present invention.

Figure 13:
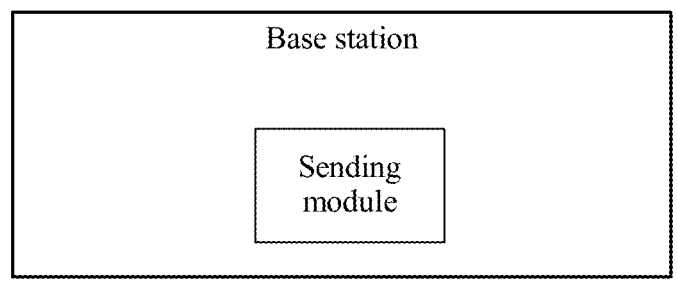
FIG. 13 is a schematic structural diagram of a base station according to an embodiment of the present invention.

FIG. 13 is a schematic structural diagram of a base station according to an embodiment of the present invention. As shown in the figure, the base station includes a sending module. The sending module performs the method and the function that are performed by the base station in the foregoing embodiment. The sending module is specifically configured to send, to a terminal device, a subframe that carries downlink control information. A specific implementation is not described in this embodiment of the present invention.

Figure 14:
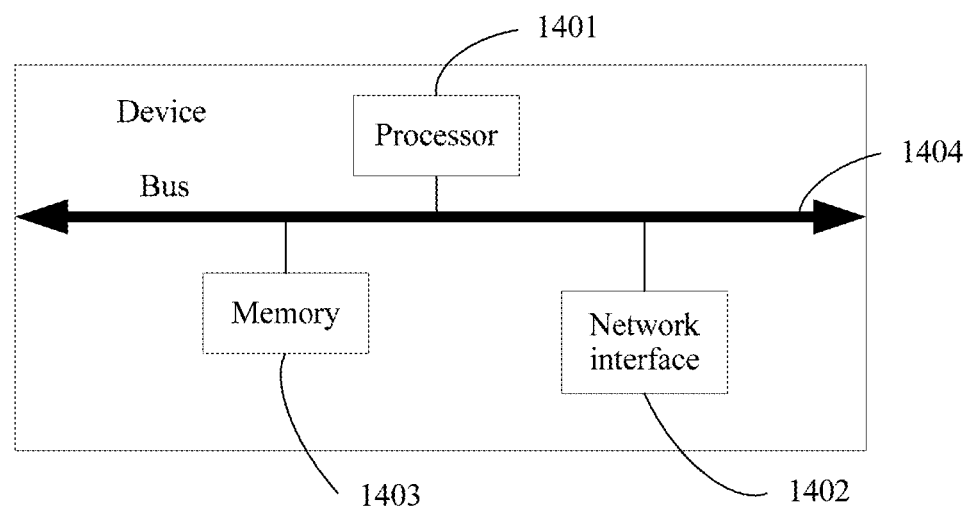
FIG. 14 is a schematic structural diagram of a beam switching device according to an embodiment of the present invention.

FIG. 14 is a schematic structural diagram of a beam switching device according to the present invention. As shown in the figure, the device may include: at least one processor 1401 such as a CPU, at least one network interface 1402, at least one memory 1403, and at least one communications bus 1404. The communications bus 1404 is configured to implement connection and communication between these components. The network interface 1402 of the device in this embodiment of the present invention is configured to perform signaling or data communication with another node device. The memory 1403 may be a high-speed RAM memory, or may be a non-volatile memory (non-volatile memory), such as at least one magnetic disk memory. Optionally, the memory 1403 may be at least one storage apparatus far away from the processor 1401. The memory 1403 stores a group of program code, and the processor 1401 executes a program in the memory 1403 that is executed by the foregoing radio access network node.

Specifically, the processor is configured to invoke the program code to perform the following operations:

receiving, by using the network interface 1402, a first subframe sent by a base station by using a first beam, where the first subframe includes first-order downlink control information and second-order downlink control information;

searching for the second-order downlink control information based on the first-order downlink control information, where the first-order downlink control information includes location indication information of the second-order downlink control information in the first subframe; and switching from the first beam to a second beam based on the found second-order downlink control information to receive a second subframe, where the second downlink control information includes a switching indication field of the second beam.

Alternatively, the processor is configured to invoke the program code to perform the following operations:

receiving, by using the network interface 1402, a first subframe and a second subframe that are sent by a base station by using a first narrow beam within coverage of a first wide beam; and switching from the first narrow beam within the coverage of the first wide beam to a second narrow beam within coverage of a second wide beam based on access control information in the first subframe and downlink control information in the second subframe to receive a third subframe, where the access control information includes switching configuration information of the second wide beam, and the downlink control information includes a switching indication field of the second narrow beam.

Alternatively, the processor is configured to invoke the program code to perform the following operations:

receiving, by using the network interface 1402, a first subframe sent by a base station by using a first beam, where the first subframe includes downlink control information; and switching from the first beam to a second beam based on the downlink control information to receive a second subframe, where the downlink control information includes a switching indication field of the second beam, the switching indication field includes a beam number, and the beam number is a quantity of bits of a preset length.

Further, the processor may further cooperate with the memory and the network interface to perform the operations of the terminal device in the foregoing embodiment of the present invention.

Figure 15:
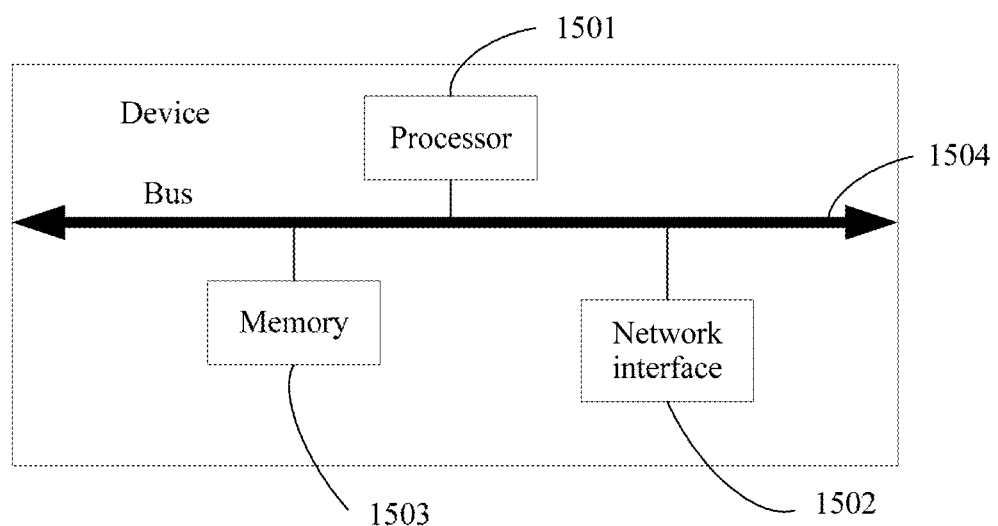
FIG. 15 is a schematic structural diagram of another beam switching device according to an embodiment of the present invention.

FIG. 15 is a schematic structural diagram of a beam switching device according to the present invention. As shown in the figure, the device may include: at least one processor 1501 such as a CPU, at least one network interface 1502, at least one memory 1503, and at least one communications bus 1504. The communications bus 1504 is configured to implement connection and communication between these components. The network interface 1502 of the device in this embodiment of the present invention is configured to perform signaling or data communication with another node device. The memory 1503 may be a high-speed RAM memory, or may be a non-volatile memory (non-volatile memory), such as at least one magnetic disk memory. In some embodiments, the memory 1503 may be at least one storage apparatus far away from the processor 1501. The memory 1503 stores a group of program code, and the processor 1501 executes a program in the memory 1503 that is executed by the foregoing radio access network node.

The processor 1501 configures first-order downlink control information and second-order downlink control information in a first subframe, where the first-order downlink control information includes location indication information of the second-order downlink control information in the first subframe, and the second downlink control information includes a switching indication field of the second beam.

The communications bus 1504 sends the first subframe to a terminal device by using a first beam.

Alternatively, the processor 1501 configures access control information in a first subframe and downlink control information in a second subframe, where the access control information includes switching configuration information of the second wide beam, and the downlink control information includes a switching indication field of the second narrow beam. The network interface 1502 sends the first subframe and the second subframe to a terminal device by using a first narrow beam within coverage of a first wide beam.

Alternatively, the processor 1501 configures downlink control information in a first subframe, the network interface 1502 sends the first subframe to a terminal device by using a first beam, and the downlink control information is used by the terminal device to switch from the first beam to a second beam to receive a second subframe.

Further, the processor may further cooperate with the memory and the network interface to perform the operations of the base station in the foregoing embodiment of the present invention.

A person of ordinary skill in the art may understand that all or some of the processes of the methods in the embodiments may be implemented by a computer program instructing related hardware. The program may be stored in a computer readable storage medium. When the program runs, the processes in the method embodiments are performed. The storage medium includes: any medium that can store program code, such as a ROM, a random access memory RAM, a magnetic disk, or an optical disc.

What is claimed is:

1. A beam switching method, wherein the method comprises:

receiving, by a terminal device, a first subframe and a second subframe sent by a base station; and switching, by the terminal device, from a first narrow beam within coverage of a first wide beam to a second narrow beam within coverage of a second wide beam based on access control information in the first subframe and downlink control information in the second subframe to receive a third subframe, wherein the access control information comprises switching configuration information of the second wide beam, and the downlink control information comprises a switching indication field of the second narrow beam.

2. The method according to claim 1, wherein both the first subframe and the second subframe comprise first-order downlink control information and second-order downlink control information; and, wherein switching, by the terminal device, from a first narrow beam within coverage of a first wide beam to a second narrow beam within coverage of a second wide beam based on access control information in the first subframe and downlink control information in the second subframe to receive a third subframe comprises:

searching, by the terminal device based on the first-order downlink control information in the first subframe, for the access control information in a data channel as indicated by the second-order downlink control information in the first subframe, and searching for the second-order downlink control information in the second subframe based on the first-order downlink control information in the second subframe, wherein the first-order downlink control information in the first subframe comprises location indication information of the second-order downlink control information in the first subframe, and the first-order downlink control information in the second subframe comprises location indication information of the second-order downlink control information in the second subframe; and switching, by the terminal device, from the first narrow beam within the coverage of the first wide beam to the second narrow beam within the coverage of the second wide beam based on the found access control information in the data channel as indicated by the second-order downlink control information in the first subframe, and based on the second-order downlink control information in the second subframe.

3. The method according to claim 2, wherein switching, by the terminal device, from the first narrow beam within the coverage of the first wide beam to the second narrow beam within the coverage of the second wide beam based on the found access control information that is in the data channel and that is indicated by the second-order downlink control information in the first subframe, and the found second-order downlink control information in the second subframe comprises:

searching, by the terminal device, for the second narrow beam within the coverage of the second wide beam from a preset beam mapping table based on the switching configuration information and the location indication information, wherein the beam mapping table is sent by the base station.

4. The method according to claim 1, wherein the switching indication field comprises a beam number, wherein the beam number indicates a quantity of bits of a first preset length, the access control information comprises a beam group number, and the beam group number is a quantity of bits of a second preset length.

5. The method according to claim 1, wherein a time interval between the first subframe and the third subframe is M subframes, a time interval between the second subframe and the third subframe is N subframes, and M and N are integers greater than or equal to 0.

6. The method according to claim 5, wherein N is a dynamically changing value, and wherein downlink control information in the first subframe comprises indication information of M; and/or downlink control information in the third subframe comprises indication information of N.

* * * * *